US008085218B2

(12) United States Patent
Heisch

(10) Patent No.: US 8,085,218 B2
(45) Date of Patent: Dec. 27, 2011

(54) PROVIDING A FLOATING ALPHANUMERIC/GRAPHICAL DISPLAY WITHOUT MOVING ELECTRONICS

(75) Inventor: Randall R. Heisch, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 1195 days.

(21) Appl. No.: 11/770,091

(22) Filed: Jun. 28, 2007

(65) Prior Publication Data

US 2009/0002269 A1 Jan. 1, 2009

(51) Int. Cl.
*G09G 3/00* (2006.01)
*G02B 26/08* (2006.01)

(52) U.S. Cl. .................................... 345/31; 359/196.1

(58) Field of Classification Search .............. 345/31–32, 345/39, 82–83; 353/79; 359/196.1, 167.1, 359/199.1, 212.2, 213.1; 362/236, 241, 243, 362/249.02, 296.09

See application file for complete search history.

(56) References Cited

U.S. PATENT DOCUMENTS

| | | | | |
|---|---|---|---|---|
| 4,218,140 | A | 8/1980 | Johnston et al. | |
| 5,057,827 | A * | 10/1991 | Nobile et al. | 345/31 |
| 5,748,157 | A | 5/1998 | Eason | |
| 5,748,302 | A | 5/1998 | Unno | |
| 6,005,659 | A | 12/1999 | D'Alessandro et al. | |
| 6,064,426 | A * | 5/2000 | Waterman | 348/63 |
| 6,222,459 | B1 * | 4/2001 | Ting | 340/815.4 |
| 6,352,357 | B1 * | 3/2002 | Woolard | 362/277 |
| 6,433,761 | B1 * | 8/2002 | Remitz | 345/31 |
| 6,549,503 | B2 * | 4/2003 | Matos | 720/600 |
| 6,559,840 | B1 * | 5/2003 | Lee | 345/419 |
| 6,567,160 | B1 | 5/2003 | Ishikawa et al. | |
| 6,614,518 | B1 | 9/2003 | Ishikawa et al. | |
| 6,628,446 | B1 * | 9/2003 | Shahar et al. | 359/212.2 |
| 6,816,137 | B2 * | 11/2004 | Leja | 345/82 |
| 7,079,042 | B2 | 7/2006 | Reim | |
| 7,128,423 | B2 * | 10/2006 | Imade et al. | 353/94 |
| 7,545,488 | B2 * | 6/2009 | Heisch | 356/213 |
| 7,740,359 | B2 * | 6/2010 | Schnuckle et al. | 353/79 |
| 2002/0084951 | A1 * | 7/2002 | McCoy | 345/31 |
| 2008/0225235 | A1 * | 9/2008 | Wang | 353/10 |
| 2010/0079729 | A1 * | 4/2010 | Scanlon | 353/13 |

OTHER PUBLICATIONS

U.S. Appl. No. 11/558,495, filed Nov. 10, 2006, Randall R. Heisch.

(Continued)

*Primary Examiner* — Bipin Shalwala
*Assistant Examiner* — Matthew Fry
(74) *Attorney, Agent, or Firm* — Stephen J. Walder, Jr.; David A. Mims, Jr.

(57) ABSTRACT

Mechanisms for providing a floating display without moving electronics is provided. The mechanisms include a stationary array of light emitting elements and a moving reflective element. As the reflective element rotates, oscillates, or otherwise moves in a path relative to the array of light emitting elements, a controller controls the illumination, i.e. the pulsing on and off, of the light emitting elements based on a location of the reflective element so as to achieve a desired image, alphanumeric message, graphical display, animated display, or the like. The reflective element may be a reflective sphere having a reflective exterior surface. In this way, the electronics used to generate the floating display are kept stationary while the reflective element is moved along a path of motion to generate the floating image. This reduces the complexity and cost of the electronics needed to generate a floating image.

19 Claims, 5 Drawing Sheets

OTHER PUBLICATIONS

"Fantazein TM, the Programmable Message Clock, displays time, date and messages floating miraculously in space.persistence of vision time, date & message float in mid-air", http://www.luberth.com/help/FANTAZEI.HTM, 1 page.

"Sharper Image: Clocks: XP3 Programmable Message Clock", http://www.sharperimage.com/us/en/catalog/productdetails/sku__FI123, 1 page.

"Fantazein: How it Works", http://www.fantazein.com/how.html, 2 pages.

U.S. Appl. No. 11/558,495, Image File Wrapper printed Mar. 17, 2011, 1 page.

* cited by examiner

PROVIDING A FLOATING ALPHANUMERIC/GRAPHICAL DISPLAY WITHOUT MOVING ELECTRONICS

BACKGROUND

1. Technical Field

The present application relates generally to an improved electronic display system and method. More specifically, the present application is directed to a system and method for providing a floating alphanumeric/graphical display without using moving electronics.

2. Description of Related Art

Recent developments in display devices have utilized the persistence of human vision to provide displays that appear to float in mid-air. Persistence of vision is the phenomenon where the human eye continues to perceive an image for nearly 1/16$^{th}$ of a second after the image has disappeared. By rapidly changing the illumination of portions of a display in less time than this 1/16$^{th}$ of a second, the human eye can be fooled into viewing an image that is not actually present.

For example, in U.S. Pat. No. 5,748,157, entitled "Display Apparatus Utilizing Persistence of Vision," issued May 5, 1998 to Richard O. Eason, a display device is described that uses a wand having a plurality of light emitting diodes (LEDs) at a tip-end of the wand which is moved in a cyclic or repetitive motion while timing the illumination of the LEDs to generate an alphanumeric message that appears to float in mid-air due to persistence of vision of the human eye. A controller is programmed for synchronizing the turning on and off of the LEDs according to a measured cycle time of the swinging motion of the wand back and forth through a region of space. Power may be supplied to the LEDs by way of batteries provided in the wand itself.

A similar mechanism is distributed under the name of the Fantazein™ programmable message clock. The Fantazein™ programmable message clock has a rapidly oscillating wand carrying tiny LEDs at its tip. As the wand is oscillated through space, the LEDs shimmer at megahertz speed so that the viewer sees their light but cannot see the wand. The result is that a complete image appears to be magically suspended in mid-air.

In a similar mechanism, described in U.S. Pat. No. 7,079,042, entitled "System for Providing Illuminated Displays on a Vehicle Tire or Wheel Assembly," issued on Jul. 18, 2006 to Kevin R. Reim, a wheel or tire of a vehicle has a plurality of LEDs integrated into the tire sidewalls or wheels. A microprocessor monitors the speed of the wheel and controls the timing of the illumination of the LEDs as they travel in a rotation path around the tire or wheel to which they are mounted. The LEDs may have their illumination timed so that desired messages or graphics are displayed on the tire or wheel using the persistence of vision phenomenon discussed above.

In each of these exemplary prior art systems, it is necessary for the electronics that power and control the LEDs to be configured such that they are able to be rotated. That is, with each of these known systems the power supplies, or at least the electrical wires conducting electrical power to the LEDs, as well as the control signals for controlling the illumination of the LEDs, must be configured so as to provide a connection between a stationary control and power source and a moving array of LEDs. Alternatively, the control and power supply mechanisms must be configured to be movable themselves with the LEDs, as in the case of U.S. Pat. No. 5,748,157. This causes the electronic mechanisms of the system to be complex in design, costly to produce, as well as susceptible to wear over time. Moreover, in cases where the electronic mechanisms are movable along with the array of LEDs, such arrangements are susceptible to shock due to dropping and other affects due to the motion of the electronics.

SUMMARY

The mechanisms of the illustrative embodiments provide a system and method for providing a rotating alphanumeric/graphical display without using rotating electronics. The mechanisms of the illustrative embodiment include a stationary array of light emitting elements, such as light emitting diodes (LEDs) or other high speed, fast impulse response light emitting elements, and a rotating reflective element, such as a rotating reflective sphere or semi-sphere. In one illustrative embodiment, the array of light emitting elements are arranged as an arced column having a radius of curvature r2 corresponding to a radius of curvature r1 of the reflective element, e.g., r2 is some multiple of r1. The light emitting elements are arranged in an arc so as to reduce the viewing angle to each light emitting element. Wide angle light emitting elements may also be used to further reduce viewing angle problems as well.

The spacing of the light emitting elements along the arced column is selected so as to achieve a desired pitch between reflections of the light emitting elements seen by an outside viewer. That is, by adjusting the radius of curvature of the arced column of light emitting elements and the spacing or separation between the light emitting elements, a desired apparent image dot pitch may be achieved.

In one illustrative embodiment, the rotating reflective element rotates in a plane substantially perpendicular to a plane of the arced column of light emitting elements, although this is not required. Alternatively, the reflective element may oscillate back and forth through an arc or path that is substantially perpendicular to the plane of the arced column of light emitting elements. Other orientations of the movement of the reflective element relative to the array of light emitting elements may be used as well. As the reflective element rotates, oscillates, or otherwise moves in a path relative to the array of light emitting elements, a controller controls the illumination, i.e. the pulsing on and off, of the light emitting elements based on a timing of the movement of the reflective element so as to achieve a desired image, alphanumeric message, graphical display, animated display, or the like.

In one illustrative embodiment, a method for generating a floating image is provided. The method may comprise moving a reflective element through a path of motion and selectively pulsing on/off one or more light emitting elements in a stationary array of light emitting elements. The pulsing on/off of the one or more light emitting elements may be performed based on a motion of the reflective element. The pulsing on/off of the one or more light emitting elements may generate the floating image when light emitted by the one or more light emitting elements, when pulsed on, is reflected by the reflective element as it is moved through the path of motion. The reflective element may be moved at a speed such that it is not perceived by an outside viewer as being present in a same location as the floating image.

Selectively pulsing on/off the one or more light emitting elements in the array of light emitting elements may comprise receiving an index pulse indicative of a position of the reflective element along the path of motion and determining a timing for pulsing on/off the one or more light emitting elements based on the index pulse. The index pulse may be generated by an index pulse generator associated with an actuator moving the reflective element through the path of motion.

The light emitting elements may be light emitting diodes (LEDs). The array of one or more light emitting elements may be a single arced column of two or more LEDs. Selectively pulsing on/off the one or more light emitting elements in an array of one or more light emitting elements may comprise pulsing LEDs of the single arced column of two or more LEDs to generate a dot matrix display. The single arced column of two or more LEDs may have a radius of curvature corresponding to a radius of curvature of the reflective element.

Selectively pulsing on/off the one or more light emitting elements may comprise pulsing on/off the one or more light emitting elements in a first pattern when the reflective element is moving through a first portion of the path of motion, and pulsing on/off the one or more light emitting elements in a second pattern when the reflective element is moving through a second portion of the path of motion. The second pattern may be a reversed version of the first pattern.

The reflective element may be a reflective sphere coupled to an actuator. The reflective sphere may be rotated through a circular path in a plane substantially perpendicular to a plane of the array of one or more light emitting elements.

The method may further comprise receiving input data via an interface. The input data may specify at least one of the floating image to be generated, characteristics of the floating image to be generated, or the path of motion for the reflective element. At least one of moving the reflective element or selectively pulsing on/off the one or more light emitting elements may be performed based on the received input data.

In one illustrative embodiment, the method for generating a floating image comprises moving a reflective element through a path of motion. The method further comprises selectively pulsing on/off one or more light emitting elements in an array of one or more light emitting elements, based on a location of the reflective element, to generate the floating image when light emitted by the one or more light emitting elements, when pulsed on, is reflected by the reflective element as it is moved through the path of motion. The reflective element may be moved at a speed such that it is not perceived by an outside viewer as being present in a same location as the floating image. The one or more light emitting elements may be stationary. The reflective element is a reflective sphere, having a reflective exterior surface, coupled to an actuator such that the reflective sphere may be rotated through the path of motion in a plane substantially perpendicular to a plane of the array of one or more light emitting elements. The path of motion may be a circular path of motion having a radius greater than a radius of the reflective sphere.

In another illustrative embodiment, a system is provided that comprises a reflective element configured to move through a path of motion, a stationary array of one or more light emitting elements, and a controller coupled to the array of light emitting elements. The controller may operate to selectively pulse on/off one or more light emitting elements in the stationary array of one or more light emitting elements based on a motion of the reflective element. The pulsing on/off of the one or more light emitting elements may generate a floating image when light emitted by the one or more light emitting elements, when pulsed on, is reflected by the reflective element as it is moved through the path of motion. The reflective element may be moved at a speed such that it is not perceived by an outside viewer as being present in a same location as the floating image.

The controller may selectively pulse on/off the one or more light emitting elements in the array of one or more light emitting elements by receiving an index pulse indicative of a position of the reflective element along the path of motion and determining a timing for pulsing on/off the one or more light emitting elements based on the index pulse. The index pulse may be generated by an index pulse generator associated with an actuator moving the reflective element through the path of motion.

The one or more light emitting elements may be light emitting diodes (LEDs). The array of one or more light emitting elements may be a single arced column of two or more LEDs. The controller may selectively pulse on/off the one or more light emitting elements in an array of one or more light emitting elements by pulsing LEDs of the single arced column of two or more LEDs to generate a dot matrix display. The single arced column of two or more LEDs may have a radius of curvature corresponding to a radius of curvature of the reflective element.

The controller may selectively pulse on/off the one or more light emitting elements by pulsing on/off the one or more light emitting elements in a first pattern when the reflective element is moving through a first portion of the path of motion, and pulsing on/off the one or more light emitting elements in a second pattern when the reflective element is moving through a second portion of the path of motion. Moreover, the reflective element is a reflective sphere coupled to an actuator such that the reflective sphere is rotated through a circular path in a plane substantially perpendicular to a plane of the array of light emitting elements.

The system may further comprise an interface coupled to the controller. The controller may receive input data via the interface. The input data may specify at least one of the floating image to be generated, characteristics of the floating image to be generated, or the path of motion for the reflective element. The controller may control at least one of moving the reflective element or selectively pulsing on/off the one or more light emitting elements based on the received input data.

In one illustrative embodiment, a system is provided that comprises a reflective element configured to move through a path of motion; a stationary array of one or more light emitting elements; and a controller coupled to the arra of one or more light emitting elements. The controller may operate to selectively pulse on/off one or more light emitting elements in the stationary array of one or more light emitting elements, based on a motion of the reflective element, to generate a floating image when light emitted by the one or more light emitting elements, when pulsed on, is reflected by the reflective element as it is moved through the path of motion. The reflective element may be moved at a speed such that it is not perceived by an outside viewer as being present in a same location as the floating image. The reflective element may be a reflective sphere coupled to an actuator such that the reflective sphere is rotated through the path of motion in a plane substantially perpendicular to a plane of the array of one or more light emitting elements. The path of motion may be circular.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

The illustrative embodiments provide a system and method for providing a floating alphanumeric/graphical display without using rotating electronics. The term "floating display" as it is used herein refers to the appearance of the display as being floating in space due to the phenomenon of persistence of vision. Because of this phenomenon, the movement of a reflective element, and the timing of the illumination of light emitting elements, the display appears to be floating in space when in fact it is reflected off of the moving reflector at a speed at which the human eye does not discern the reflective element being present in the space.

With the illustrative embodiments, the electronics for providing the floating display are all stationary while the reflective element moves along a path comprising the space in which the display is to be generated. By arranging the display such that the electronics may be kept stationary, the problem of having to provide complex and costly electronics for facilitating motion of the electronics is avoided. Moreover, stationary electronics eliminate the need for providing power to rotating or oscillating electronics, eliminates the need for two sets of electronics (one stationary and one rotating), and reduces the wear and tear on the electronics due to the rotation or oscillation of the electronics.

Figure 1A:
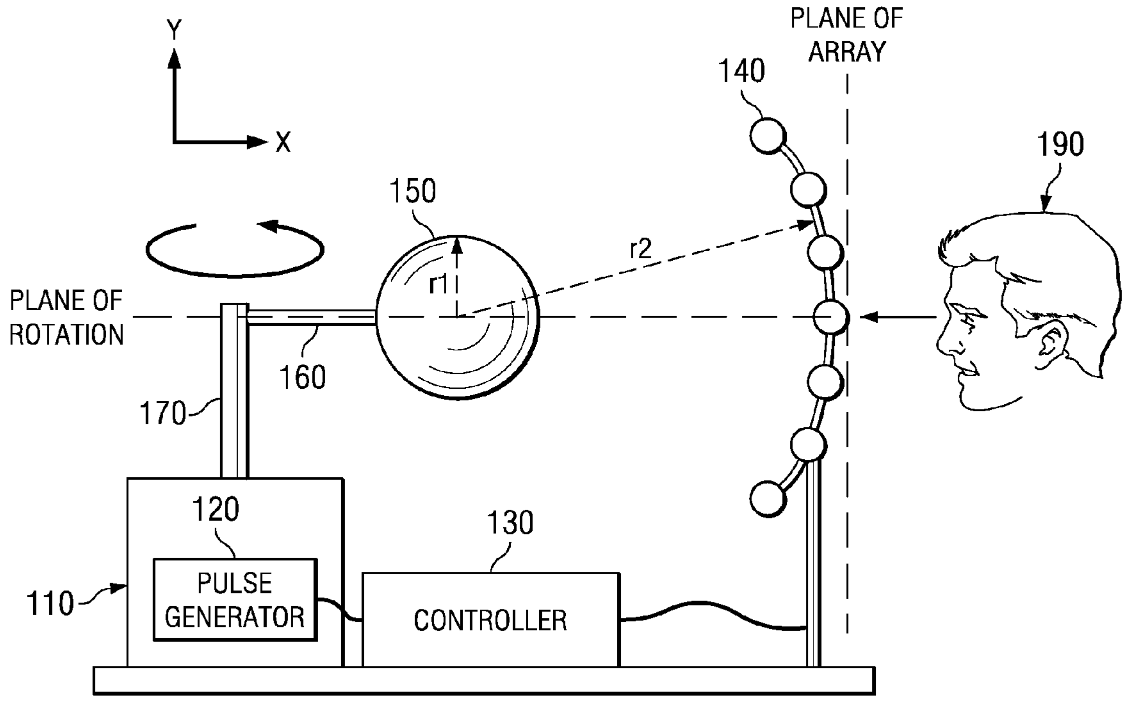
FIG. 1A is an exemplary diagram of a side view of a display arrangement in accordance with one illustrative embodiment.
Figure 1B:
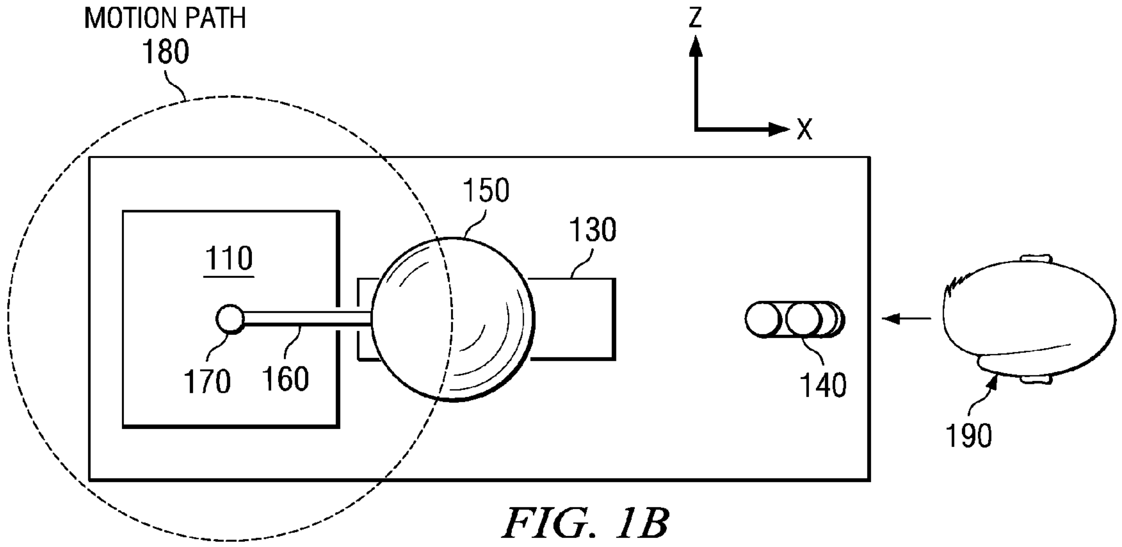
FIG. 1B is an exemplary top view of a display arrangement corresponding to FIG. 1A.

FIG. 1A is an exemplary diagram of a side view of a display arrangement in accordance with one illustrative embodiment. FIG. 1B is an exemplary top view of a display arrangement corresponding to FIG. 1A. As shown in FIGS. 1A-1B, the display apparatus/system comprises an actuator 110 having an index pulse generator 120 associated with it, a controller 130, a light emitting element array 140, a reflective element 150, an arm 160, and a rotating shaft 170. The actuator 110, which may be a motor or other mechanism for causing rotation or motion, serves to rotate the shaft 170 in order to cause the arm 160, and thus the reflective element 150 which is attached to the arm 160, to move in a circular motion through the motion path 180 depicted in FIG. 1B. The index pulse generator 120 provides an index pulse in response to the shaft 170 or arm 160 reaching a predetermined position in its rotation. This index pulse is provided to the controller 130 which uses the index pulse to determine when to send control signals to cause various ones of the light emitting elements of the light emitting element array 140 to illuminate.

The actuator 110 may be any mechanism for causing the motion of reflective element 150 through a path of motion. The actuator 110, in the depicted example, is coupled to the rotating shaft 170 and the arm 160 for moving the reflective element 150 through the motion path 180. However, rather than this arrangement, other arrangements of the actuator 110 relative to the reflective element 150 may be used in order to achieve motion of the reflective element 150 through a motion path, such as motion path 180, that may or may not involve the use of a rotating shaft 170 and arm 160. Furthermore, the actuator 110 may in fact be an existing device to which the reflective element 150 is attached or fastened for use with the other mechanisms of the illustrative embodiments. For example, the actuator 110 may take the form of a ceiling or oscillating fan, a jigsaw blade, or any other device that generates a predictable movement path. The only requirement, which in fact may be optional if the implementer is willing to sacrifice precise timing/position of the floating image, is that an index pulse or other mechanism for determining the position of the reflective element 150 be used to control the timing of the illumination of the light emitting elements.

The index pulse generator 120 may be any type of index pulse generator 120 for sending an electrical pulse to the controller 130 in response to the position of the reflective element 150 being determined to be at a predetermined position in the motion path 180. For example, the index pulse generator 120 may generate an index pulse that is transmitted to the controller 130 in response to the detection of each complete rotation, i.e. revolution, of the shaft 170. A notched or slotted optical switch, magnetic detector, or the like, may be used to determine when a complete rotation of the shaft 170 is achieved. Similarly, rather than basing the index pulse on the detected rotation of the shaft 170, the rotation of the arm 160 or the reflective element 150 itself may be detected using a suitable detector so as to generate the index pulse that is sent to the controller 130. Preferably, the predetermined position in the motion path 180 is some position remotely located from a closest position of the reflective element 150 to the light emitting element array 140 in the motion path 180 in order to provide time to send control signals to illuminate light emitting elements of the light emitting element array 140.

Based on the index pulse received from the index pulse generator 120, the controller 130 determines a rate of rotation of the reflective element 150 and a relative position of the reflective element 150 to the light emitting element array 140. Based on this information, the controller 130 determines a timing for sending control signals to the light emitting element array 140 to cause various ones of the light emitting elements to illuminate. Essentially, the controller 130 uses the index pulse to synchronize timing of the control signals to each revolution of the reflective element 150. The light emitting elements are appropriately pulsed on and off with a variety of potential data to form the illusion of an alphanumeric and/or graphical display of a message/image floating in space, as discussed hereafter. The particular alphanumeric and/or graphical display that is to be formed by the pulsing on and off of the light emitting elements may be pre-programmed into the controller 130, may be selected or input by a user via a user input device (not shown), or the like.

The light emitting element array 140 is comprised of a plurality of light emitting elements arranged in an array. In one illustrative embodiment, this array comprises a single column of light emitting elements, the single column having any number of light emitting elements provided in the column. The particular number of light emitting elements provided in the column may be selected based on the resolution of the floating message/image desired. For example, a column of 7 light emitting elements may provide a 5×7 matrix (i.e. a column of 7 LEDs is strobed in 5 distinct columns forming the perception of a 5×7 dot matrix display), 9 light emitting elements may provide a 7×9 matrix, or N light emitting elements may provide an N×M matrix. The particular number of light emitting elements may be selected according to the desired implementation. For example, a column of 32 light emitting elements may be used to generate a 32×15 matrix to form Japanese Kanji characters or the like. Moreover, for each point source of light in the column, a group of one red, one green, and one blue light emitting element may be provided and strobed in a similar manner as a single color light emitting element to provide a full color display.

The light emitting elements, in some illustrative embodiments, are light emitting diodes (LEDs). LEDs are used in the illustrative embodiments because LEDs are able to be pulsed with high frequency. The LEDs are fast impulse response illumination devices that allow strobing with precise timings. The precisely timed strobing of the LEDs allow a dot matrix to be created for alphanumeric or graphical data, or continuous lines of varying length. Other high frequency light emitting elements may be used without departing from the spirit and scope of the illustrative embodiments. The LEDs are arranged in an arced column in one illustrative embodiment. The arc preferably has a radius of curvature r2 corresponding to a radius of curvature r1 of the reflective element 150, e.g., r2 is some multiple of r1 in FIG. 1A. It should be appreciated that the radius of curvature r1 of the reflective element 150, and thus the radius of curvature r2 of the light emitting element array 140, may be any radius, including a 0 radius, i.e. no curvature, suitable to the particular implementation of the illustrative embodiments. The LEDs are arranged in an arc to reduce the viewing angle to each LED. Wide angle LEDs may also be used to further help in reducing viewing angle problems.

The LEDs are spaced along the arced column to generate a desired apparent image dot pitch of the floating message/image display. That is, the arc distance between LEDs in the light emitting element array 140 establishes the apparent pitch between the perceived LED reflections seen by an outside viewer 190. Appropriately adjusting r2 and the LED arc distance or separation between LEDs cerates the desired apparent image dot pitch. Thus, the spacing of the LEDs in the arced column, the distance to the reflective element 150 from the light emitting element array 140, the radius of curvature r1 of the reflective element 150, and the radius of curvature r2 of the light emitting element array 140 all are selected to achieve a desired floating message/image display.

The reflective element 150, in the depicted example, is a reflective sphere that is rotated through the motion path 180 at a speed in excess of the speed at which the phenomenon of persistence of vision occurs. That is, as discussed above, the human eye perceives an image for nearly $1/16^{th}$ of a second after the image has disappeared. The speed of rotation of the reflective element 150 is preferably selected such that when the human eye views the display, the reflective element 150 appears to have moved or is not visible while the reflection of the light from the LEDs off of the reflective element 150 persists. Thus, the reflective element 150 is not perceived while the reflected light is perceived thereby giving the illusion that the message/image that is created by the reflected light is floating in space. Such a floating image may be updated at a rate up to and exceeding a display refresh rate of 1/60 second or faster, which removes all perceived "flicker" of the resulting image.

Using the index pulse generated by the index pulse generator 120, the controller 130 sends control signals to the LEDs of the light emitting element array 140 to appropriately pulse on and off individual ones of the LEDs so that the light will be reflected appropriately from the moving reflective element 150. The LEDs are pulsed at a high enough frequency and timing that characters and images in at least two dimensions may be generated based on the movement of the reflective element 150.

Based on the timing of the pulsing of the LEDs, an alphanumeric or graphical image may be generated in a region of space. The image may be stationary or may appear to traverse through a circular/elliptical path. The image may be allowed to shift back and forth within an arc of the circular/elliptical path, may be animated, or the like based on the timing selected by the controller 130 for pulsing the LEDs. The result is a floating message/image similar to that of the known mechanisms described above, but without requiring the use of moving electronics.

The above description assumes that the message/image is produced only on one half of the rotation cycle of the reflective element 150, i.e. is only produced in one half of the motion path 180. However, in other illustrative embodiments, the message/image may be produced in two halves of the rotation cycle, i.e. throughout the motion path 180. In these other illustrative embodiments, data may be strobed out in a forward manner for the duration of a first half of the rotation period of the reflective element 150, In a second half of the rotation period of the reflective element 150, the data may be strobed out in a reverse order. Since the reflective element 150, which in this illustrative embodiment is a reflective sphere, provides a reflection of the LEDs from all possible angles, the LEDs are also reflected back to the viewer through the entire 360 degrees of the rotation period. However, strobed data will appear to be reversed during the second half of the rotation unless the data is strobed out in reverse during the second cycle, in which case its perceived order will be correct and forward appearing data will be viewable during the entire 360 degrees of rotation through the motion path 180. Using this embodiment, the image that is generated on the second half of the rotation period of the reflective element 150 may appear farther away than the image generated on the first half of the rotation period which may give the outside viewer the impression that the combined image is moving along the path of the reflective element 150.

It should be appreciated that while FIGS. 1A-1B are described above as providing a rotating motion of a spherical reflective element 150 in a plane substantially perpendicular to the general plane of the light emitting element array 140, i.e. a plane that is tangential to the light emitting element array 140, the present invention is not limited to such. To the contrary, the illustrative embodiments may use a reflective element 150 that is moved through a linear or arcing motion that does not involve a complete 360 degrees of rotation. The reflective element 150 may move through an arcing path of any portion of a full 360 degrees of rotation. Moreover, the reflective element 150 may be moved in a straight, substantially straight, or even oscillating path without departing from the spirit and scope of the present invention. Essentially, any path of motion may be traversed with the reflective element 150 without departing from the spirit and scope of the illustrative embodiments.

Moreover, the reflective element 150 is not limited to having a spherical geometry. To the contrary, the reflective element 150 may be a semi-sphere, a flat reflective panel, or any other geometry that is suitable for reflecting the light emitted by the light emitting elements to an outside viewer 190. In some illustrative embodiments, the reflective element 150 may not have a consistent radius of curvature and may in fact have various radius of curvature depending on the point on the surface of the reflective element 150 viewed.

Moreover, if desired, the reflective element 150 may be comprised of piezoelectric material that is able to change its configuration based on the application of electric current to the piezoelectric material and thus, is able to change its radius of curvature at various points of the reflective element 150. The controller 130 may control the application of such electrical current to achieve a desired curvature of the reflective element. However, with such an embodiment, electrical connections would need to be made with the reflective element 150 thereby decreasing some of the benefit of the stationary electronics arrangement of the illustrative embodiments but providing a greater ability to provide more complex images, animations, and the like.

Furthermore, the illustrative embodiments are not limited to the reflective element 150 being moved through a plane perpendicular to the light emitting element array 140. To the contrary, the reflective element 150 may be moved through any motion path relative to the light emitting element array 140. Such motion paths may include motion through more than one plane relative to the light emitting element array 140. For example, the reflective element 150 may rotate in one plane substantially perpendicular to the plane of the light emitting element array 140, i.e. a plane that is tangential to the arced column, and oscillate through a plane parallel to the plane of the light emitting element array 140. Other paths of motion may be used with the mechanisms of the illustrative embodiments without departing from the spirit and scope of the present invention.

Figure 2:
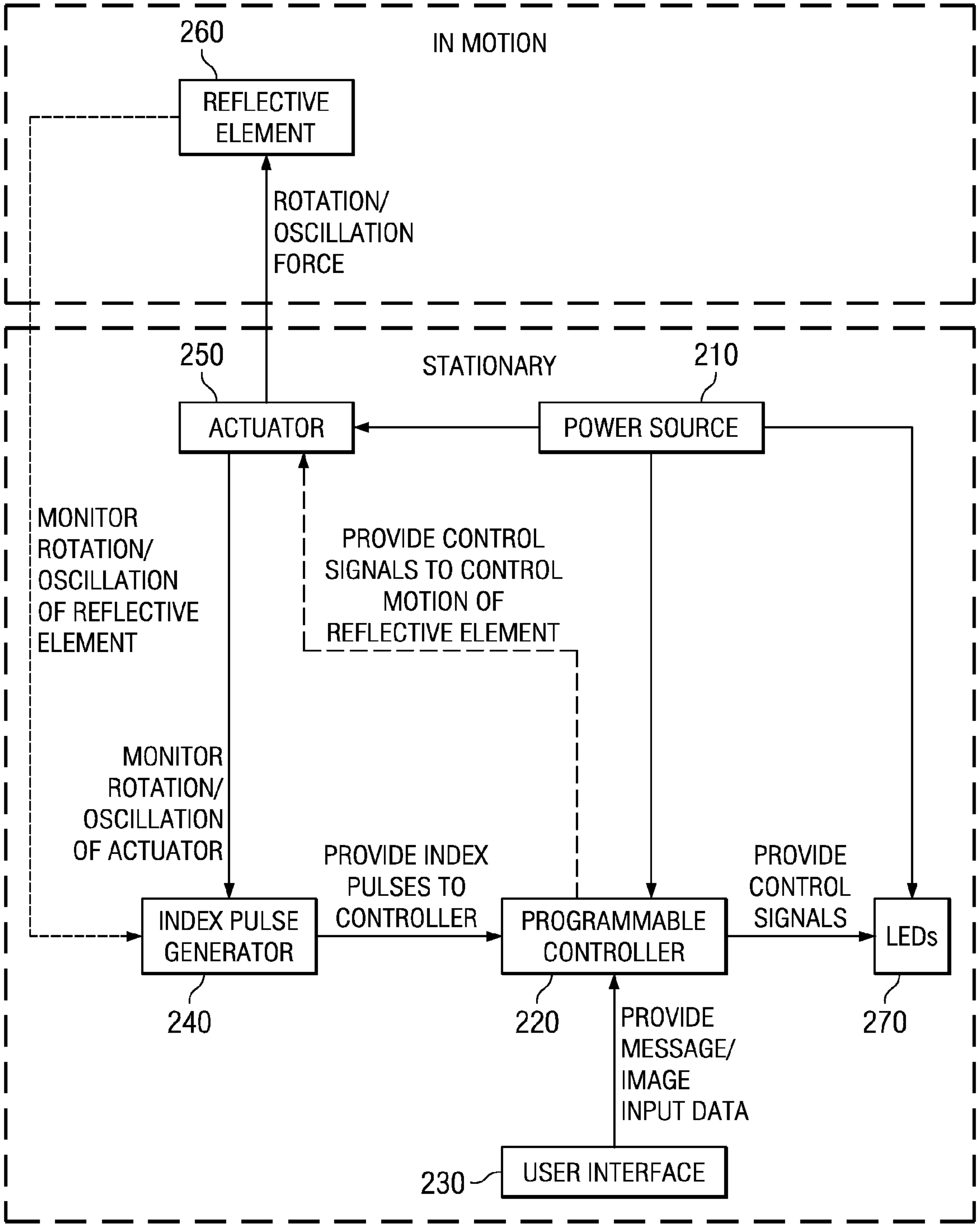
FIG. 2 is an exemplary block diagram illustrating an interaction between the primary operational elements of a display apparatus/system in accordance with one illustrative embodiment.

FIG. 2 is an exemplary block diagram illustrating an interaction between the primary operational elements of a display apparatus/system in accordance with one illustrative embodiment. While FIGS. 1A and 1B illustrate the configuration of one illustrative embodiment of the display apparatus/system, FIG. 2 is provided in block form to illustrate the interaction between the elements in FIGS. 1A and 1B as well as to emphasize the stationary nature of the electronics relative to the mobile nature of the reflective element.

As shown in FIG. 2, a power source 210 provides power to the actuator 250, the programmable controller 220, and the LED array mechanism 270. The actuator 250 is coupled to the reflective element 260 and imparts a rotation/oscillation force to the reflective element 260 when powered. An index pulse generator 240 monitors the rotation/oscillation of the actuator 250, and/or the reflective element 260, to generate an index pulse that is transmitted to the programmable controller 220.

It is important to note that only the reflective element 260 is in motion during the operation of the display apparatus/system. The other elements 210-250 and 270 are stationary. Thus, the electronics that control the operation of the display apparatus/system are stationary and the mobile portion does not contain any electronics. As a result, the display apparatus/system may be provided with less electronics, lower cost electronics, and may avoid problems associated with the motion of electronics found in known systems.

The programmable controller 220 preferably is provided with software, hardware, or any combination of software and hardware, for performing various functions to control the pulsing of the LEDs in the LED array mechanism 270 based on message/image input data pre-programmed into the programmable controller 220 or provided via the user interface 230, and the index pulses received from the index pulse generator, as discussed above. While a programmable controller 220 is shown in FIG. 2, and assumed to be used in the description of the illustrative embodiments hereafter, it should be appreciated that the illustrative embodiments are not limited to using a programmable controller 220. To the contrary, the programmable controller 220 may be a hardwired digital logic state machine, a simple analog mechanism, or the like.

Assuming that a programmable controller 220 is utilized, a user may input message/image input data for specifying an alphanumeric message or an image to be generated by the LED array mechanism 270 when reflected by the reflective element 260. The programmable controller 220 stores this data and uses it to determine which individual LEDs of the LED array mechanism 270 should be pulsed at which time (based on the index pulses received from the index pulse generator 240) in order to generate the display specified by the stored input data. The user interface 230 may be any type of interface capable of inputting data into the programmable controller 220. Examples of such interfaces include a keyboard, computer mouse, trackball, pointing device, various dedicated real or virtual buttons, a computer with a data connection to the programmable controller 220, or the like.

In some illustrative embodiments, the user may input additional display characteristics which the programmable controller 220 may use to control the pulsing of the LEDs in LED array mechanism 270, the motion of the reflective element 260, or the like. For example, in some illustrative embodiments, the actuator 250 may be able to change the rotation/oscillation of the reflective element 260 based on control signals received from the programmable controller 220. Thus, the user may input data specifying a desired motion path of the reflective element 260 which is then achieved by the programmable controller 220 sending appropriate control signals to the actuator 250 to cause the actuator 250 to move the reflective element 260 in the manner input by the user. In this way, the user may customize the path of the reflective element 260 for a desired effect.

In other illustrative embodiments, the characteristics may include specifying a color of the message/image to be displayed, a periodicity of a change in color of the message/image display, or other effects. In such an embodiment, multiple columns of LEDs of various colors, such as red, green, and blue, may be provided in the LED array mechanism 270 and may be controlled based on the user input data received by the programmable controller 220. The position of each column of LEDs relative to the motion path(s) of the reflective element 260 are know a priori by the programmable controller 220, i.e. are stored in the programmable controller 220, and thus, can be used to adjust the timing of the pulsing of the LEDs based on the index pulses received by the programmable controller 220. Many other customizations may be made using the mechanisms of the illustrative embodiments as will be readily apparent to those of ordinary skill in the art in view of the present description.

Figure 3:
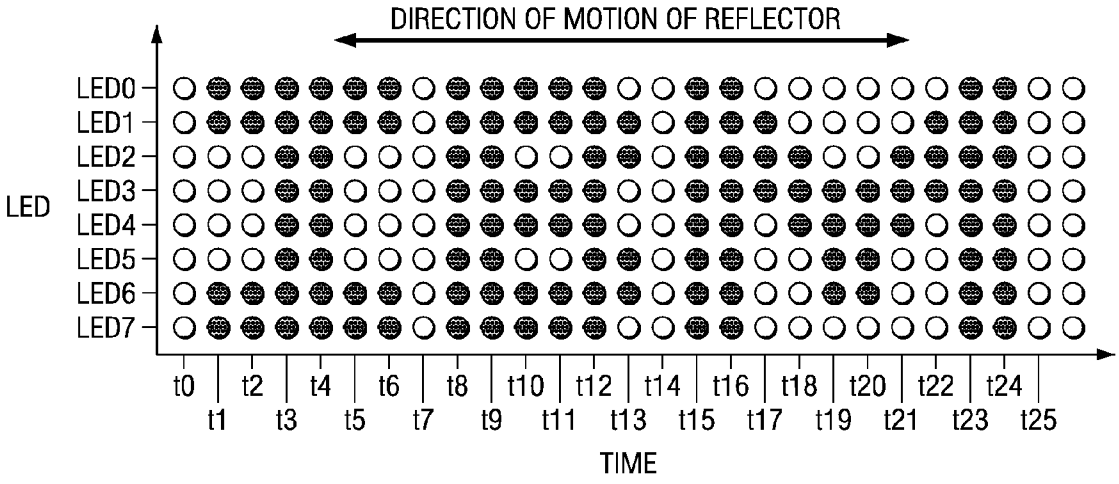
FIG. 3 is an exemplary diagram illustrating the timing of illumination of the light emitting elements of the display apparatus/system in accordance with one illustrative embodiment.

As mentioned above, the illustrative embodiments may be used to generate a floating message/image by properly timing the illumination of light emitting elements, such as LEDs, based on the motion of the reflective element. FIG. 3 is an exemplary diagram illustrating the timing of illumination of the light emitting elements, e.g., LEDs, of the display apparatus/system in accordance with one illustrative embodiment. As shown in FIG. 3, the message to be displayed on the display apparatus/system is the acronym "IBM." Assuming that the reflective element is rotating in a direction corresponding to the time axis, i.e. from left to right of the diagram, the darkened circles represent the LEDs, in the LED array mechanism, that are illuminated at the corresponding time point along the time axis. Thus, for example, at a time point t0, none of the LEDs 0-7 are pulsed on. At a second time point t1, the LEDs 0, 1, 6, and 7 are pulsed on to generate a first part of the letter "I". These same LEDs are again pulsed on at time point t2. At a fourth time point t3, all of the LEDs 0-7 are pulsed on to generate the main part of the letter "I". This process continues through time point t25. It should be appreciated that the difference between time points is very small such that the outside viewer does not discern the serial time points but instead perceives the entire message "IBM" to be present and floating in space at the same time. For example, the time between time points may be the time that it takes an LED to move $1/10^{th}$ of its radius such that an outside viewer does not perceive any "smearing" of the resulting image. The shorter the time between time points the better the resulting image will be up to a limit at which the LEDs are not left on long enough and a faint light output is perceived.

Figure 4:
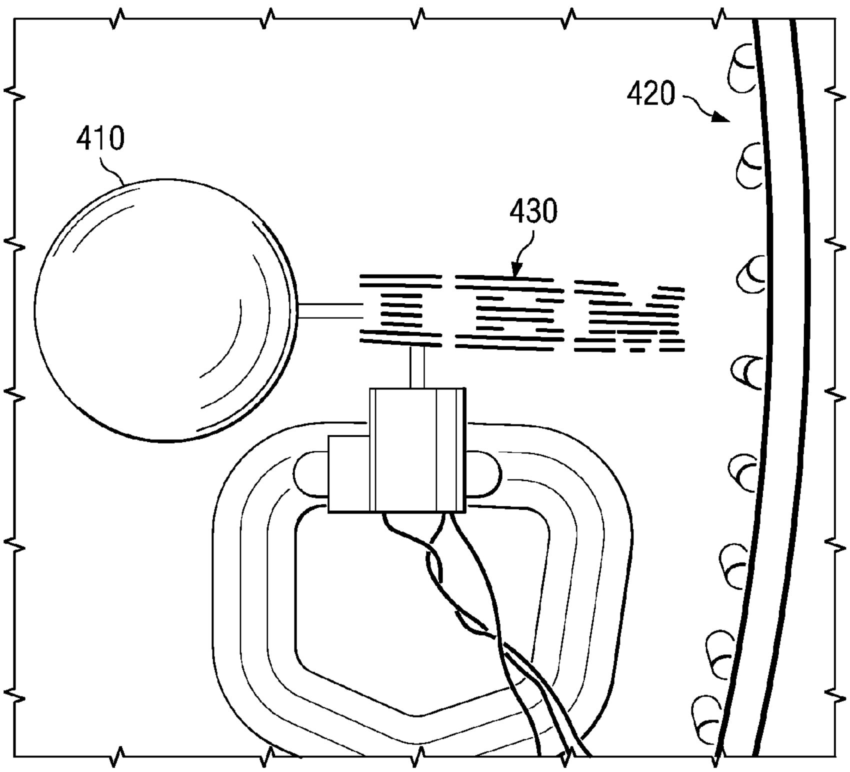
FIG. 4 is an exemplary diagram illustrating an exemplary display generated using mechanisms of one illustrative embodiment.

With proper timing of the illumination of the LEDs, as illustrated by the example in FIG. 3, a message/image may be generated that appears to float in space. FIG. 4 is an exemplary diagram illustrating the appearance of an alphanumeric message generated using the mechanisms of one illustrative embodiment. The diagram in FIG. 4 represents an image that would be obtained using high speed photographic equipment with a relatively slow shutter speed taking a picture of an instance in time of the operation of one illustrative embodiment. As shown in FIG. 4, the reflective element 410 is not present in the same location as the message "IBM" 430. Thus, the message "IBM" 430 appears to be floating in space between the reflective element 410 and the array of LEDs 420. This is because of the high speed at which the reflective element 410 is moved and the phenomenon of persistence of vision of the human eye which is simulated by the slow shutter speed of the photographic equipment.

Figure 5:
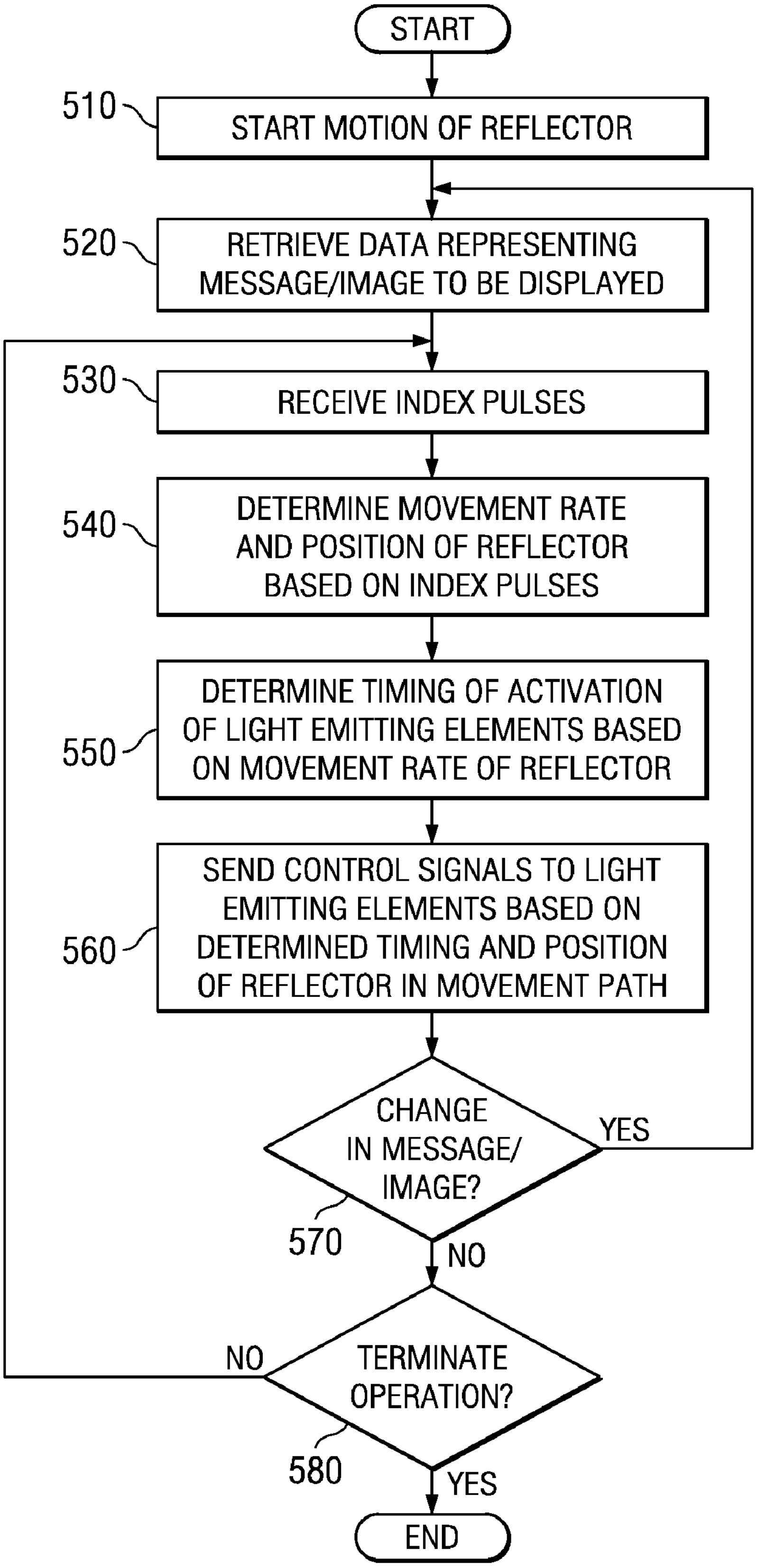
FIG. 5 is a flowchart outlining an exemplary operation for generating a display of a message/image using the display apparatus/system of one illustrative embodiment.

As discussed above, the controlling of the illumination of the light emitting elements, e.g., LEDs, may be performed by the controller based on index pulses or the like. The functionality of the controller may be implemented in hardware, software, or any combination of hardware and software. Regardless of the hardware and/or software nature of the functionality, the operations performed by the controller may be the same. FIG. 5 is a flowchart outlining an exemplary operation of such a controller for generating a display of a message/image using the display apparatus/system of one illustrative embodiment.

It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks. Alternatively, the computer program instructions may be hardwired into a hardware device using digital logic, may be implemented using a simple digital state machine, or the like.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

As shown in FIG. 5, the operation starts with starting the motion of the reflective element (step 510). It should be appreciated that in illustrative embodiments in which the motion of the reflective element may be controlled by user input, the starting of the motion of the reflective element may involve retrieving the user specified characteristics and determining a motion path for the reflective element. Appropriate control signals may then be generated and sent to the actuator to cause the reflective element to be moved along the selected motion path.

Data representing the message/image to be displayed may then be retrieved (step 520). This data, as discussed previously, may be received from a user via a user interface, retrieved from a storage device, or the like. The data may specify the alphanumeric characters to be displayed, the image to be displayed, and characteristics of the characters or image. As mentioned above, such characteristics may include color of the characters or image, a manner by which to change the color, etc. Other possible characteristics may include spacing between characters, font type, size, etc. These characteristics may be used to adjust the control signals generated by the controller so that a desired effect is achieved.

Index pulses are received (step 530) and a movement rate and position of the reflective element based on the index pulses is determined (step 540). An appropriate timing of the activation, i.e. pulsing on/off, of the light emitting elements based on the movement rate and position of the reflective element is determined (step 550). Appropriate control signals are then sent to the light emitting elements based on the determined timing and position of the reflective element in the movement path (step 560). For example, the time for a rotating, or reciprocating motion, may be measured between two index pulses, thus determining the period of oscillation. This period may then be appropriately divided into timing columns over which the LEDs are strobed based on the message/image to be displayed.

A determination is made as to whether the message or image data has changed (step 570). The message or image data may be changed, for example, in response to an input from a user, a programmed schedule of when the message/image is to change, or the like. If the message or image data has changed, the operation returns to step 520. If the message or image data has not changed, a determination is made as to whether a termination operation has occurred (step 580). Such a termination operation may be, for example, receipt of a command to discontinue operation, powering down of the actuator, an error condition being detected, etc. If a termination operation has occurred, the operation terminates. Otherwise, the operation returns to step 530.

Thus, the illustrative embodiments provide a mechanism for providing a floating alphanumeric/graphical display without using moving electronics. As a result, the floating alphanumeric/graphical display apparatus/system may be provided with less complex and costly electronics than known devices and may avoid many of the problems associated with movement of electronics found in such known devices.

Figure 6A:
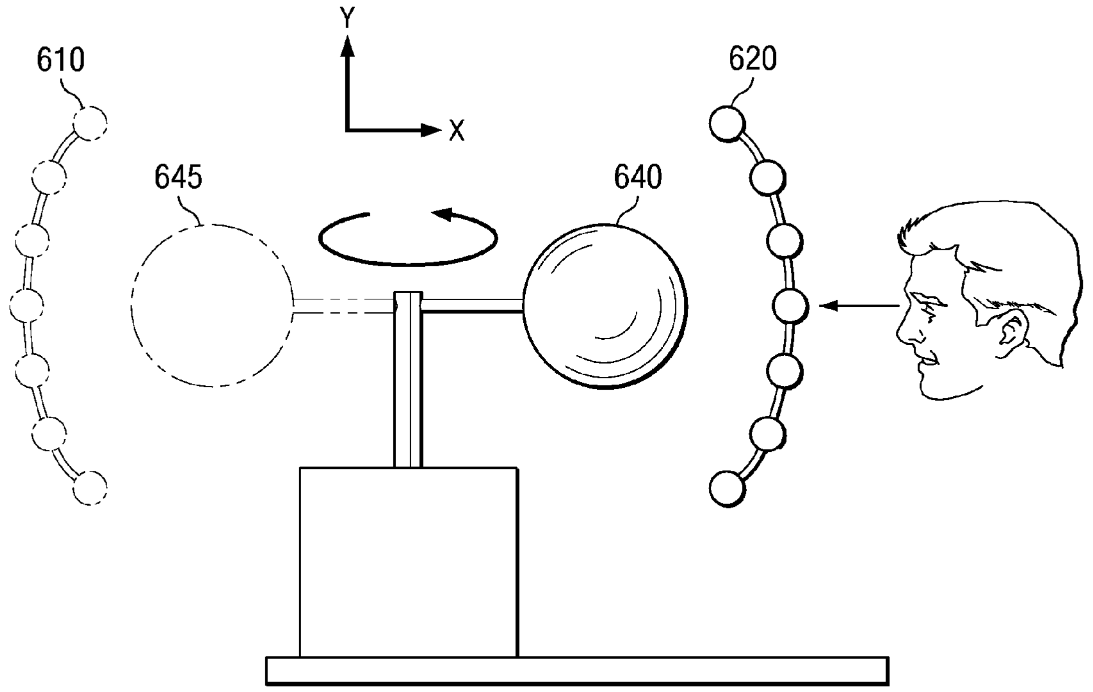
FIGS. 6A-6B are exemplary diagrams of alternative arrangements for providing a display apparatus/system in accordance with the illustrative embodiments.
Figure 6B:
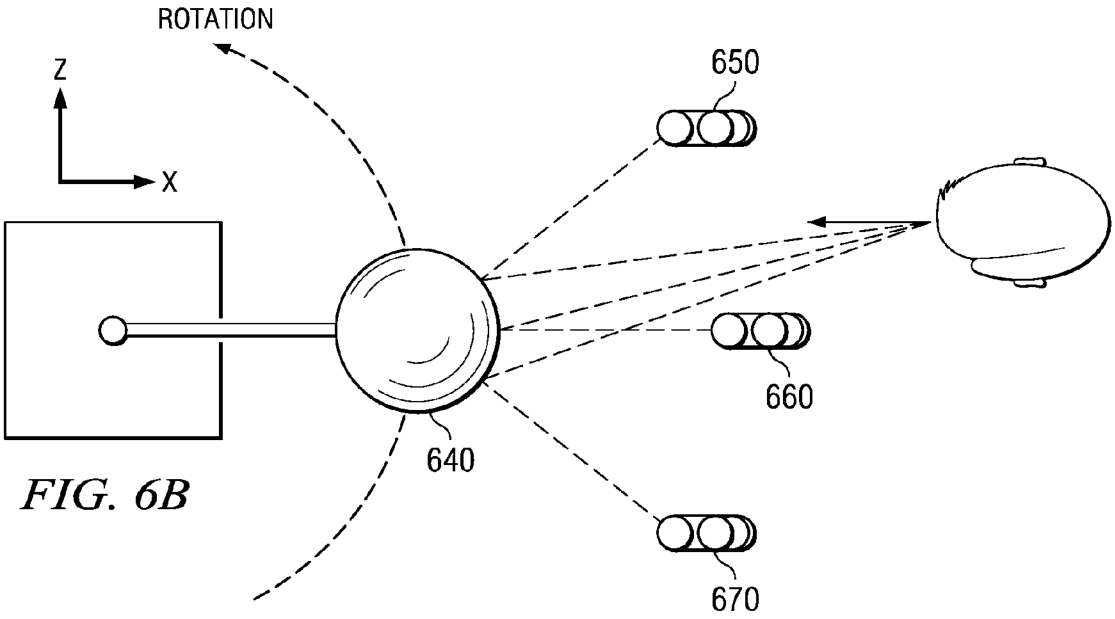

The above figures set forth exemplary embodiments of the invention and exemplary arrangements of elements however it should be appreciated that the present invention is not limited to the depicted example embodiments. Many modifications to the depicted embodiments may be made without departing from the spirit and scope of the present invention. For example, FIGS. 6A-6B are exemplary diagrams of alternative arrangements for providing a display apparatus/system in accordance with the illustrative embodiments. In FIG. 6A, multiple arrays 610 and 620 of light emitting elements are provided at opposite positions along the circular path of motion of the reflective element 640. In this way, different messages/images may be displayed on different sides of the circular path of motion. This embodiment may be expanded to provide additional arrays (not shown) at other portions of the circular path of motion so as to provide additional possible messages/images along other portions of the circular path.

In other illustrative embodiments, as illustrated by the ghost image 645 in FIG. 6A, multiple reflective elements may be utilized. For example, two reflective spheres may be provided at opposite ends of an arm which is rotated by the actuator and shaft in a similar manner as previously described. Of course more than two reflective elements may also be used. Such embodiments may require additional index pulses for timing of the pulsing of the LEDs and may require more complex programming of the controller to keep track of the position of each of the reflective elements and determine the pulse timing of the LEDs taking into consideration each of the reflective elements. Moreover, there is no requirement that each of the reflective elements be positioned at a same distance from the rotating shaft or the arrays of LEDs. Furthermore, there is no requirement that each reflective element be of the same configuration, e.g., sphere, semisphere, flat, etc., and each may be of a different shape and configuration.

In yet another alternative illustrative embodiment, as shown in FIG. 6B, multiple arrays of LEDs 650-670 may be provided on a same side of the circular path of motion of the reflective element. These arrays may allow a larger arc range of the circular path of motion through which the outside viewer may perceive the floating message/image. Moreover, such additional arrays may provide multicolor messages/images, by providing different colors from different arrays, or the like. Various effects may be achieved by providing various numbers and arrangements of arrays of light emitting elements and reflective elements, as well as appropriate programming of the controller.

It should be appreciated that the illustrative embodiments may take the form of an entirely hardware embodiment or an embodiment containing both hardware and software elements. In one exemplary embodiment, the control mechanisms of the illustrative embodiments may be implemented in software, which may be firmware, resident software, microcode, etc., while the physical apparatus controlled by the control mechanisms is implemented in hardware.

Furthermore, the control elements of the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for generating a floating image, comprising:

moving a reflective element through a path of motion; and selectively pulsing on/off one or more light emitting elements in an array of one or more light emitting elements, based on a location of the reflective element, to generate the floating image when light emitted by the one or more light emitting elements, when pulsed on, is reflected by the reflective element as it is moved through the path of motion, wherein the reflective element is moved at a speed such that it is not perceived by an outside viewer as being present in a same location as the floating image, and wherein the one or more light emitting elements are stationary, wherein the reflective element is a reflective sphere, having a reflective exterior surface, coupled to an actuator such that the reflective sphere is rotated through the path of motion in a plane substantially perpendicular to a plane of the array of one or more light emitting elements, and wherein the path of motion is a circular path of motion having a radius greater than a radius of the reflective sphere.

2. The method of claim 1, wherein the one or more light emitting elements are one or more light emitting diodes (LEDs), and wherein the array of one or more light emitting elements is a single arced column of two or more LEDs, wherein the single arced column of two or more LEDs has a non-zero radius of curvature corresponding to a non-zero radius of curvature of the reflective element.

3. The method of claim 2, wherein selectively pulsing on/off the one or more light emitting elements in an array of one or more light emitting elements comprises:

pulsing LEDs of the single arced column of two or more LEDs to generate a dot matrix display.

4. The method of claim 1, wherein selectively pulsing on/off the one or more light emitting elements comprises pulsing on/off the one or more light emitting elements in a first pattern when the reflective element is moving through a first portion of the path of motion, and pulsing on/off the one or more light emitting elements in a second pattern when the reflective element is moving through a second portion of the path of motion.

5. The method of claim 4, wherein the first portion of the path of motion is a portion of a first semi-circle of the path of motion that is closest to the array of one or more light emitting elements, and wherein the second portion of the path of motion is a portion of a second semi-circle of the path of motion that is furthest away from the array of one or more light emitting elements.

6. The method of claim 1, further comprising:

receiving input data via an interface, the input data specifying at least one of the floating image to be generated, characteristics of the floating image to be generated, or the path of motion for the reflective element, wherein at least one of moving the reflective element or selectively pulsing on/off the one or more light emitting elements is performed based on the received input data.

7. A system, comprising:

a reflective element configured to move through a path of motion;

a stationary array of one or more light emitting elements; and a controller coupled to the array of one or more light emitting elements, wherein the controller operates to selectively pulse on/off one or more light emitting elements in the stationary array of one or more light emitting elements, based on a location of the reflective element, to generate a floating image when light emitted by the one or more light emitting elements, when pulsed on, is reflected by the reflective element as it is moved through the path of motion, and wherein the reflective element is moved at a speed such that it is not perceived by an outside viewer as being present in a same location as the floating image, wherein the reflective element is a reflective sphere, having a reflective exterior surface, coupled to an actuator such that the reflective sphere is rotated through the path of motion in a plane substantially perpendicular to a plane of the array of one or more light emitting elements, and wherein the path of motion is circular and has a radius greater than a radius of the reflective sphere.

8. The system of claim 7, wherein the one or more light emitting elements are light emitting diodes (LEDs), and wherein the array of one or more light emitting elements is a single arced column of two or more LEDs, wherein the single arced column of two or more LEDs has a non-zero radius of curvature corresponding to a non-zero radius of curvature of the reflective element.

9. The system of claim 8, wherein the controller selectively pulses on/off the one or more light emitting elements in an array of one or more light emitting elements by:

pulsing LEDs of the single arced column of two or more LEDs to generate a dot matrix display.

10. The system of claim 7, wherein the controller selectively pulses on/off the one or more light emitting elements by pulsing on/off the one or more light emitting elements in a first pattern when the reflective element is moving through a first portion of the path of motion, and pulsing on/off the one or more light emitting elements in a second pattern when the reflective element is moving through a second portion of the path of motion.

11. The system of claim 7, further comprising an interface coupled to the controller, wherein the controller receives input data via the interface, the input data specifying at least one of the floating image to be generated, characteristics of the floating image to be generated, or the path of motion for the reflective element, and wherein the controller controls at least one of moving the reflective element or selectively pulsing on/off the one or more light emitting elements based on the received input data.

12. A computer program product comprising a non-transitory computer useable medium having a computer readable program, wherein the computer readable program, when executed on a computing device, causes the computing device to:

move a reflective element through a path of motion; and selectively pulse on/off one or more light emitting elements in an array of one or more light emitting elements, based on a location of the reflective element, to generate the floating image when light emitted by the one or more light emitting elements, when pulsed on, is reflected by the reflective element as it is moved through the path of motion, wherein the reflective element is moved at a speed such that it is not perceived by an outside viewer as being present in a same location as the floating image, and wherein the one or more light emitting elements are stationary, wherein the reflective element is a reflective sphere, having a reflective exterior surface, coupled to an actuator such that the reflective sphere is rotated through the path of motion in a plane substantially perpendicular to a plane of the array of one or more light emitting elements, and wherein the path of motion is circular and has a radius greater than a radius of the reflective sphere.

13. The method of claim 5, wherein the second pattern is a reversed version of the first pattern.

14. The method of claim 1, further comprising:

receiving user input specifying a characteristic of the floating image; and controlling at least one of moving the reflective element through the path of motion or selectively pulsing on/off the one or more light emitting elements to provide the specified characteristic of the floating image.

15. The method of claim 14, wherein the characteristic comprises at least one of a desired motion path for the reflective element, one or more desired colors of the floating image, or a periodicity of a change in color of the floating image.

16. The system of claim 10, wherein the first portion of the path of motion is a portion of a first semi-circle of the path of motion that is closest to the array of one or more light emitting elements, and wherein the second portion of the path of motion is a portion of a second semi-circle of the path of motion that is furthest away from the array of one or more light emitting elements.

17. The system of claim 7, wherein the path of motion comprises both the circular path of motion in the plane substantially perpendicular to the plane of the array of one or more light emitting elements, and an oscillating path of motion in a plane substantially parallel to the plane of the array of one or more light emitting elements.

18. The system of claim 7, wherein the reflective element is a first reflective element and wherein the system further comprising a second reflective element configured to move through the path of motion, wherein the second reflective element is a reflective sphere.

19. The system of claim 18, wherein the first reflective element is positioned at a first radial distance from a center of the path of motion and the second reflective element is positioned at a second radial distance from a center of the path of motion, and wherein the first radial distance and second radial distance are different.

* * * * *